United States Patent [19]
Blinn et al.

[11] 3,779,827
[45] Dec. 18, 1973

[54] PROCESS FOR PRODUCING A FATIGUE RESISTANT TIRE CORD

[75] Inventors: Harold A. Blinn, Akron; William T. Overby, Mogadore, both of Ohio

[73] Assignee: The Goodyear Tire & Rubber Company, Akron, Ohio

[22] Filed: Dec. 20, 1971

[21] Appl. No.: 210,184

[52] U.S. Cl.......... 156/330, 117/76 T, 117/151 ZB, 117/161 L, 156/110 C, 156/176, 156/315, 156/335
[51] Int. Cl........................... B29h 9/04, B32b 25/02
[58] Field of Search................ 156/78, 110 C, 176, 156/177, 178, 179, 330, 335, 308, 315; 117/76 T, 80, 161 ZB, 161 L; 28/75 R; 57/164, 153, 140 C; 161/175

[56] References Cited
UNITED STATES PATENTS

| 3,436,288 | 4/1962 | Patterson | 156/330 |
| 3,423,230 | 1/1969 | Georges | 156/330 |
| 2,719,795 | 10/1955 | Nottebohm | 117/11 |
| 2,902,398 | 9/1959 | Schroeder | 161/184 |
| 3,419,452 | 12/1968 | Krysiak | 156/330 |

*Primary Examiner*—Daniel J. Fritsch
*Attorney*—F. W. Brunner et al.

[57] ABSTRACT

Relates to an improved method for the application of a liquid adhesive to a rubber reinforcing rod to minimize penetration of the adhesive into the interstices of the cord. The cord is passed into the adhesive which is in the form of a foam capable of wetting the surface of the cord. The adhesive is deposited on the surface of the cord. As the bubble structure of the foam collapses, a minimum amount of adhesive is deposited on the surface of the cord and substantially none in the interstices of the cord.

5 Claims, No Drawings

PROCESS FOR PRODUCING A FATIGUE RESISTANT TIRE CORD

This invention relates to the bonding of a reinforcing cord to rubber and to an improved method for the application of the adhesive to the cord to minimize the penetration of the adhesive into the interstices of the cord.

In the usual tire cord dipping operation, liquid adhesive penetrates the cord and when the adhesive is cured the cord becomes resistant to flexing thus contributing to fatigue in a finished structure such as a pneumatic tire. The stiffening is especially evident when the adhesive contains an epoxy ingredient.

It is known that dipping the cord under tension tightens the fiber and minimizes access to the interstices of the cord thereby excluding the adhesive from the interstices or interior of the cord until the adhesive is cured thus presenting a more flexible and more fatigue resistant cord. However, such a procedure requires special equipment at the adhesive dipping site and also presents certain difficulties in holding a consistant tension on the cord throughout the dipping operation.

A more facile, efficient and economical manner of producing a flexible cord consistent with acceptable adhesion has been discovered. It has been observed that an extremely thin layer of adhesive may be deposited on the exterior of the cord while at the same time preventing the deposition of the adhesive into the interstices of the cord. These desirable results are obtained by converting the adhesive composition into a foam by incorporating air throughout the liquid adhesive.

The nature of the foam with regard to cell size and the stiffness of the foam is important. Extremely small bubble size of an average of less than about ½ to 1 millimeter gives a stiff foam which allows a tunnel to form in the body of foamed adhesive so that the cord loses contact with the body of foam. Larger bubbles permit the foam to flow and refill the space where the cord passes and hence wets the cord continuously with foam. This latter action is necessary to uniformly treat the cord with adhesive. A satisfactory solution exists when the bubble size is controlled to within a range of from an average of about 2 to about 3 millimeters in diameter by regulating the concentration of surfactant and the amount of air passed into the liquid adhesive to form the foam.

The cord to be treated with the adhesive is passed through the foam to thereby deposit on the surface of the cord a layer of foamed adhesive. The foam treated cord can be visualized as having adhering thereto a series of small bubbles containing in the walls thereof the adhesive. The bubbles adhere to the exposed surface of the cord and bridge the interstices. As the cord leaves the foamed adhesive dip tank, the bubble structure of the foamed adhesive layer on the cord begins to collapse and through the action of surface tension deposits a thin layer of adhesive on the surface of the cord where the bubble structure made contact. Thus the interstices where no contact was made by the bubbles is left substantially free of the adhesive. The adhesive is then heat set to form a highly flexible and yet effective cord to rubber bond.

From prior experience it has been determined that epoxy adhesives, although giving superior adhesion of polyester fiber to rubber, also stiffen the cord, due in part to excessive penetration of the adhesive into the cord filaments. The penetration of the adhesive into the interstices of the cord causes the fatigue life of the cord to be reduced because of the inability of the cord to flex freely under the rapid flexing of, for example, the side walls of a pneumatic tire traveling at turnpike speeds. This resistance to flexing results in heat build-up in the side walls of the tire which leads to the ultimate failure of the adhesive bond between the cord and the rubber.

Any adhesive composition may be used and particularly desirable results are obtained when using polyepoxide adhesives, particularly of the nature shown by the following U. S. Pat. Nos.: 3,036,948; 3,308,007; 3,307,966; 2,902,398; 3,423,230 and 3,247,043. The epoxylated novolac used in the examples is prepared by treating a non-heat hardening phenol formaldehyde condensation product with epichlorohydrin, a well-known preparation.

The following example is illustrative of the process of this invention, all parts being by weight.

EXAMPLE 1

An emulsion of an epoxy resin was prepared from the following ingredients.

| Ingredients | Parts used | Range |
|---|---|---|
| 1. Adhesive resin<br>i.e. epoxylated novolac<br>(epoxy equivalent 170 and<br>viscosity 40,000 cps at 52°C.) | 100 | 100 |
| 2. Nonionic surfactant<br>i.e. Triton X-100<br>Isooctyl phenoxy polyethoxy ethanol<br>(10 moles of ethylene oxide) | 4 | 1–10<br><br><br><br>2–6 |
| 3. Water | 3362 | 10,000–1,500 |
| 4. Solids % | 3% | 1–7% |
| 5. Curing agent for epoxy resin<br>i.e. tetraethylene pentamine | 6 | 5–8 |

The epoxy resin is heated to 10°F. above its melting point and the surfactant is then blended into the heated resin. Part of the water (2017 parts) at room temperature are added to the resin/surfactant blend slowly with rapid stirring until the emulsion inverts from a water-in-oil to an oil-in-water emulsion. The remainder (1345 parts) of the water is then added rapidly to obtain a 3 percent emulsion of adhesive resin. When the emulsion is ready to be used, a water soluble curing agent for the epoxy resin is added. Part of this mixture (100 parts) is placed in a conventional dip tank provided with means at the bottom thereof to pass air into the dip tank up through a frit glass filter and then up through the adhesive to form a volume of densely packed bubbles of adhesive above the unfoamed adhesive being foamed. A pulley is mounted in the dip tank in the volume of foamed adhesive and a cord is then passed into the dip tank through the foamed adhesive around the pulley and out of the dip tank and directly into a curing oven to dry at 425°F. for 2½ minutes, after which a second adhesive of an R/F/L type as described below is applied to the cord and the cord is again dried at 425°F. for 2½ minutes. The treated cord is then imbedded in a conventional rubber stock compounded as follows and cured at 300°F. for 15 minutes.

TABLE I

Rubber Stock

| Ingredients | Parts |
|---|---|
| Natural rubber | 100 |
| Zinc oxide | 3.00 |
| Carbon black | 29.80 |
| Stearic acid | 2.00 |

| Ingredient | Parts |
|---|---|
| Pine tar | 7.00 |
| Mercaptobenzothiazole | 1.25 |
| Sulfur | 3.00 |
| Diphenylguanidine | 0.15 |
| Phenyl beta naphthylamine | 1.00 |

A conventional type R/F/L adhesive composition is made in accordance with the following formula.

R/F/L Adhesive

| Ingredients | Parts | Range |
|---|---|---|
| Resorcinol | 2.03 | 1–5 |
| Formaldehyde (37%) | 2.62 | 1–6 |
| Sodium Hydroxide (10%) | 2.00 | 1–3 |
| Terpolymer rubber latex of styrene/butadiene-1,3/vinylpyridine, 15/70/15 (41%) | 14.20 | 10–20 |
| Copolymer rubber latex of styrene/butadiene-1,3 (39%) | 27.40 | 15–30 |
| Water | 200 | 50–500 |

The cured samples of cord and rubber are tested for adhesion and fatigue. The following results are obtained.

From this data it is observed that unexpectedly high

TABLE II

| Exp. | Percent solids in 1st dip | Weight percent 1st dip pickup | Weight percent 2d dip R/F/L pickup | Strip adhesion (lbs./in. width) RT(70°F) | Strip adhesion (lbs./in. width) 250°F | Mallory fatigue rating |
|---|---|---|---|---|---|---|
| 1 | 3 Control | 0.80 | 4.5 | 90 | 45 | 100 |
| 2 | 3 (foam) | .03 | 4.5 | 95 | 40 | 120 |
| 3 | 5 (foam) | .09 | 4.5 | 90 | 40 | 143 |
| 4 | 7 (foam) | .25 | 4.5 | 90 | 40 | 99 | adhesion is obtained when using as much as 400 percent less adhesive as shown in Example 2 than used in Example 1 while at the same time obtaining a 120 percent increase in fatigue. It is also observed that when more than 0.03 percent adhesive is applied to the cord and up to as much as 0.25, no increase in adhesion is observed while some decrease in Mallory fatigue rating is obtained.

The second adhesive dip of R/F/L may be foamed in the same manner as described for the first dip and applied over the first dip. Comparable improvement in fatigue is noted. It is thus observed that an unexpected result has been obtained when depositing an adhesive composition onto a cord by means of the foaming technique described herein.

The foaming technique of this invention may be extended to other reinforcing fabrics where penetration of the adhesive presents a problem in regard to stiffening. For example, when flat belt fabric is dipped in an adhesive emulsion the water of the emulsion penetrates the interstices of the fabric to such an extent that excessive heat is needed to dry the fabric. By the use of the present invention using the foamed process, an effective amount of adhesive may be applied to the exposed areas of the cord to provide maximum adhesion while at the same time using less adhesive and less water because the interstices of the cord are not wetted by the adhesive resulting in less heat to remove the water from the adhesive during drying, and using less dip solids while producing substantially the same results as are obtained by conventional dipping processes. Thus, the use of this invention results in an improved flexible cord and at the same time a more economical and efficient operation because of the reduction in cost of materials and cost of processing.

While certain representative embodiments and details have been shown for the purpose of illustrating the invention, it will be apparent to those skilled in this art that various changes and modifications may be made therein without departing from the spirit or scope of the invention.

What is claimed is:

1. A method of bonding a cord to rubber to provide a more fatigue resistant structure which comprises forming a foam of an adhesive to be used as the bonding agent between the cord and the rubber, said foam having an average cell size diameter larger than 1 millimeter, applying the foamed adhesive to the cord, allowing the bubbles of the foam to collapse and thereby depositing adhesive on the cord, heat setting the adhesive on the cord, imbedding the cord in rubber and heat treating the assembly to form a bond between the cord and the rubber.

2. The method of claim 1 wherein the cord is a polyester cord and the adhesive contains an epoxy resin.

3. The method of claim 1 wherein the foam is supported by a soap.

4. The method of claim 1 wherein the adhesive comprises phenol/formaldehyde resin, a vinylpyridine latex and a soap stabilizing agent.

5. The method of claim 1 wherein the bubble size of the foam is from about 2 millimeters to about 3 millimeters.

* * * * *